US009558758B1

(12) United States Patent
Piersol et al.

(10) Patent No.: US 9,558,758 B1
(45) Date of Patent: Jan. 31, 2017

(54) USER FEEDBACK ON MICROPHONE PLACEMENT

(71) Applicant: Amazon Technologies, Inc., Seattle, WA (US)

(72) Inventors: Kurt Wesley Piersol, San Jose, MA (US); Michael Alan Pogue, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 76 days.

(21) Appl. No.: 14/713,300

(22) Filed: May 15, 2015

(51) Int. Cl.
*H04B 3/20* (2006.01)
*H04M 9/08* (2006.01)
*G10L 21/0208* (2013.01)
*G10L 15/28* (2013.01)
*H04R 1/08* (2006.01)
*H04R 3/00* (2006.01)
*H04B 3/23* (2006.01)

(52) U.S. Cl.
CPC .......... *G10L 21/0208* (2013.01); *G10L 15/28* (2013.01); *H04R 1/08* (2013.01); *H04R 3/002* (2013.01); *G10L 2021/02082* (2013.01); *H04B 3/20* (2013.01); *H04B 3/23* (2013.01); *H04M 9/082* (2013.01)

(58) Field of Classification Search
CPC .......... H04R 1/08; H04R 3/002; H04R 3/005; H04M 9/08; H04M 9/082; H08B 3/20; H08B 3/23–3/238; G10L 15/20; G10L 15/28; G10L 15/265; G10L 21/0208; G10L 2021/02082
USPC ........................ 381/66, 110, 94.1, 94.2, 94.3; 379/406.01–406.16; 704/226, 227, 228, 704/231, 233, 246–250; 455/570
See application file for complete search history.

(56) References Cited

U.S. PATENT DOCUMENTS

| 6,434,110 B1 * | 8/2002 | Hemkumar | H04M 9/082 370/201 |
|---|---|---|---|
| 6,744,885 B1 * | 6/2004 | Ketchum | G10L 15/22 370/286 |
| 7,539,300 B1 * | 5/2009 | Benyassine | H04B 3/234 379/406.04 |
| 7,724,893 B2 * | 5/2010 | Johnston | H04B 3/23 379/406.08 |
| 8,311,234 B2 * | 11/2012 | Sakuraba | H04M 9/082 379/406.14 |
| 8,619,970 B2 * | 12/2013 | Nagy | H04B 3/23 379/406.08 |
| 9,373,318 B1 * | 6/2016 | Piersol | G10K 11/175 |
| 2015/0112672 A1 * | 4/2015 | Giacobello | H04M 9/082 704/233 |
| 2015/0349841 A1 * | 12/2015 | Mani | H04M 9/082 379/406.09 |

* cited by examiner

*Primary Examiner* — Xu Mei
(74) *Attorney, Agent, or Firm* — Seyfarth Shaw LLP; Ilan N. Barzilay

(57) ABSTRACT

A speech-controlled appliance that provides a user with an indication of when a speech input will likely not be acted upon by the device due to a poor signal-to-noise conditions. The device may provide this indication even without a speech input, so that the user may be informed that a command will not be acted upon before speaking the command. The indication may be, for example, lighting a visual indicator on the device, and/or outputting an audible notification via a speaker. The visual indicator may be a same indicator the device uses to indicate when its microphone(s) are muted so that the user will intuitively recognize that a speech command will not be acted upon by the device.

20 Claims, 5 Drawing Sheets

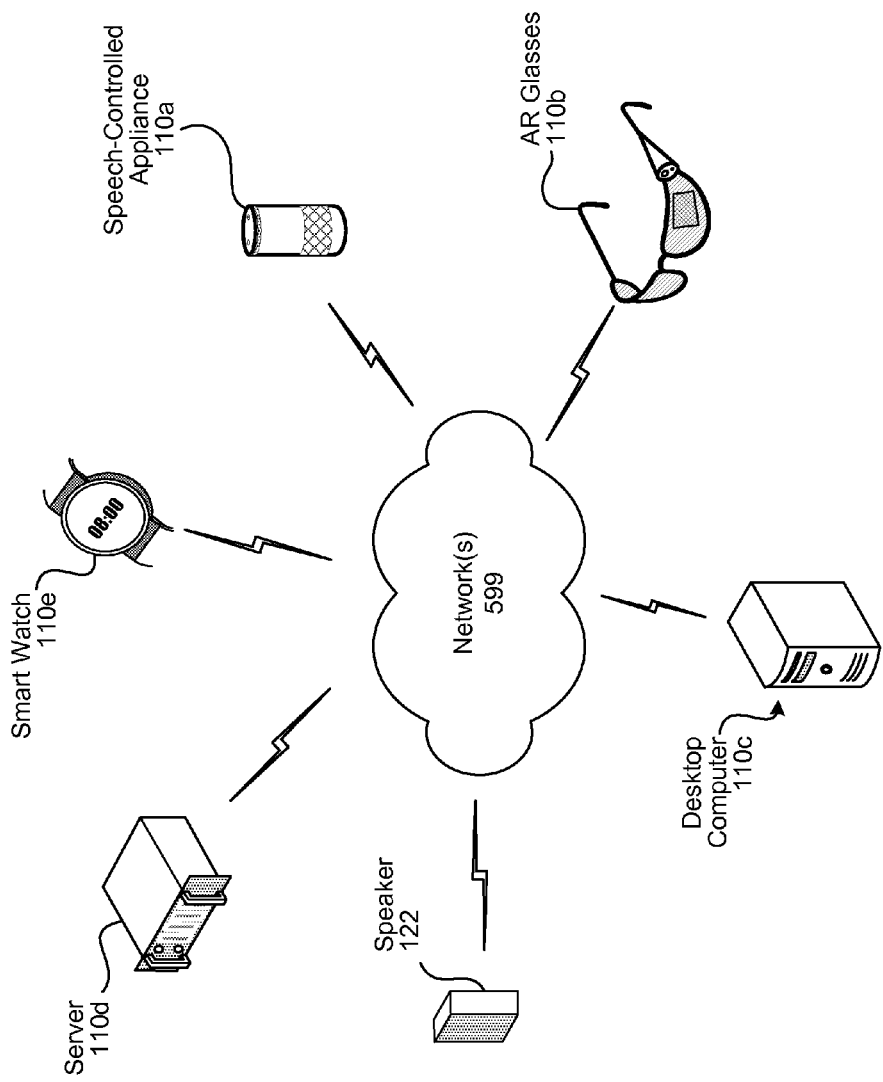

USER FEEDBACK ON MICROPHONE PLACEMENT

BACKGROUND

Speech recognition systems have progressed to the point where humans can interact with speech-enabled computing devices entirely relying on speech commands. Such systems employ techniques to identify the words spoken by a human user based on the various qualities of a received audio input. Speech recognition combined with natural language processing techniques enable speech-based user control of a computing device to perform tasks based on the user's spoken commands. The combination of speech recognition and natural language processing techniques is commonly referred to as speech processing. Speech processing may also convert a user's speech into text data which may then be provided to various text-based software applications.

BRIEF DESCRIPTION OF DRAWINGS

For a more complete understanding of the present disclosure, reference is now made to the following description taken in conjunction with the accompanying drawings.

FIG. 5 illustrates an example of a computer network for use with the speech-enabled device.

DETAILED DESCRIPTION

Speech-enabled devices may perform a wide variety of functions. One of those functions if the playback or streaming of audio media such as music. When the audio media is played through loudspeaker(s) (as compared to headphones), the audio media can interfere with a device's ability to discriminate between a user's speech inputs such as spoken utterances, speech inputs from another source such as computer-generated speech, and the reproduced audio media output by the loudspeaker(s).

Ideally, this problem would be remedied by automatic echo cancellation (AEC) which would remove the reproduced audio playback from the audio received via a device's microphone(s). Unfortunately, particularly when external speakers are too close to the microphone(s), AEC may have trouble cleaning up the audio captured by the microphone(s). In such a case, the remaining interference after AEC may prevent the speech-enabled device from correctly interpreting a speech command in a speech input, such as for example a device "wake" word that signals to the device that the user is speaking to the device.

This shortcoming of AEC may occur, for among other reasons, due to drift in timing synchronization between the external speaker and the speech-enabled device. For example, if the difference between the external clock of Bluetooth-connected speakers and the device is off by more than five parts per million (relative to a synchronous clock used to control timing of the speech-enabled device), the reduced performance of AEC may cause speech recognition to fail.

Figure 1:
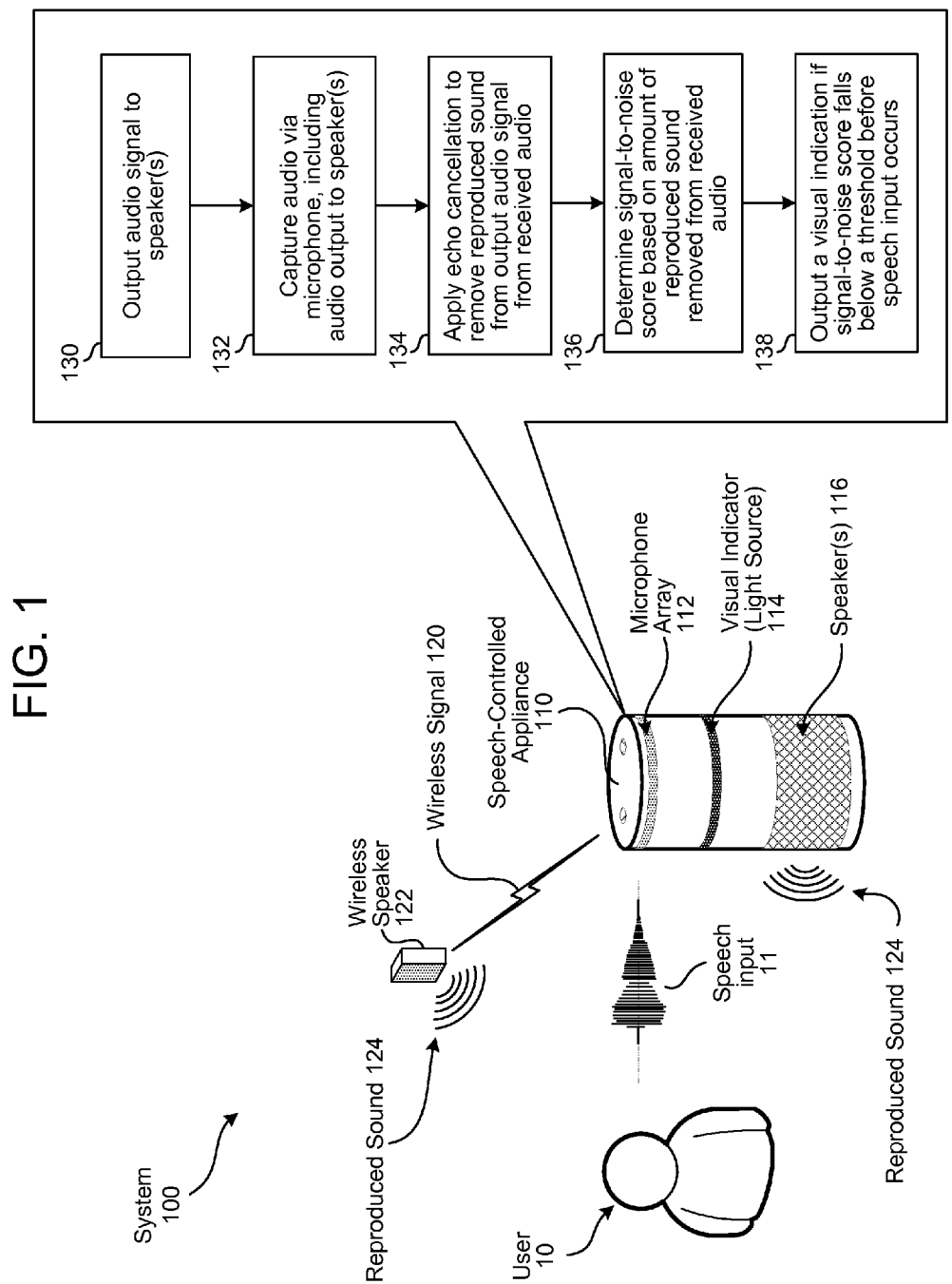
FIG. 1 illustrates a system for that provides a user with an indication as to whether audio being output by a speech-enabled device will likely interfere with the device's ability to interpret speech input.

FIG. 1 illustrates a system 100 including a speech-controlled appliance 110 that provides a user 10 an indication whether speech input 11 from the user is likely to be understood by the device 110 due to a poor signal-to-noise condition, prior to existence of the speech input 11. By providing this indication prior to speech input 11, the user 10 may be informed that a command may not be acted upon before speaking a spoken command. The indication may be, for example, lighting a visual indicator 114 on the device, and/or outputting an audible notification via a speaker(s) 116/124. The visual indicator 114 may be a same indicator the device uses to indicate when its microphone(s) are muted (e.g., because the user 10 has pressed a "mute" button), so that the user 10 will intuitively recognize that a speech command may not be understood by the device.

The device 110 outputs (130) an audio signal including content such as music to one or more speaker(s) 116/122. The speaker(s) may be internal to the device 110, connected via a wired connection, or connected via a wireless connection 120, such as a Bluetooth connection. The speaker(s) 116/124 output the content as reproduced sound 124.

While the reproduced sound 124 is being output by the speaker(s) 116/122, the device 110 is listening for speech commands via one or more microphones (e.g., microphone array 112) capturing (132) ambient sounds including the reproduced sound 124.

The device 110 applies (134) echo cancellation to the captured audio to remove the reproduced sound 124 from the captured audio. Any echo cancellation technique may be used to align the content in the output (130) audio with the reproduced content as captured by the microphone(s), subtracting the time-aligned output content from the captured audio.

The performance of echo cancellation is quantified. For example, an estimate of echo return loss enhancement (ERLE) may be calculated by either the echo canceller or by comparing the post-cancellation audio signal with the output content removed with the signal received at the microphone. A higher ERLE indicates that more content was removed from the captured audio, where as a lower ERLE indicates that less content was removed.

A signal-to-noise score is determined (136) based on the amount of reproduced sound that was removed from the received audio (e.g., based on the ERLE). Among other things, the signal-to-noise score may be further based on an average intensity of the echo-cancelled signal. This score is a quantification used to approximate the likelihood that the device's speech recognition algorithm will be able to correctly interpret a speech input 11, based on sound levels and the accuracy of echo cancellation.

Based on the score, the device 110 outputs (138) a visual indication if the signal-to-noise score falls below a threshold value prior to receiving the speech input 11. For example, a visual indicator (light source) 114 may be lit to indicate to the user that a user command will not be understood. The visual indicator 114, as noted above, may be the same indicator used to indicate to the user 11 that the microphone(s) are muted, or may be a different indicator. An audible notification may also be output to the speaker(s), either in combination with the visual indicator or instead of the visual indicator.

Among other uses, the indicator may be used by the user 11 to determine where to place the device 110 and/or an external speaker (e.g., wireless speaker 122) in a room so as to optimize the ability of the device's speech recognition system to recognize spoken commands even when the device is outputting audio content (e.g., via speaker(s) 116 of the device 110 and/or external speaker(s) 122), which is being reproduced at a loud volume. The user may utilize this feature to perform a calibration operation by placing the device 110 and then seeing how the device responds while audio content is present, based on an estimate of what the intensity of an utterance would be (without requiring an actual utterance). Moreover, by being able to estimate responsiveness to speech-based commands when the user is silent, the user 10 can anticipate whether the device 110 will or will not be able understand speech inputs 11.

Figure 2:
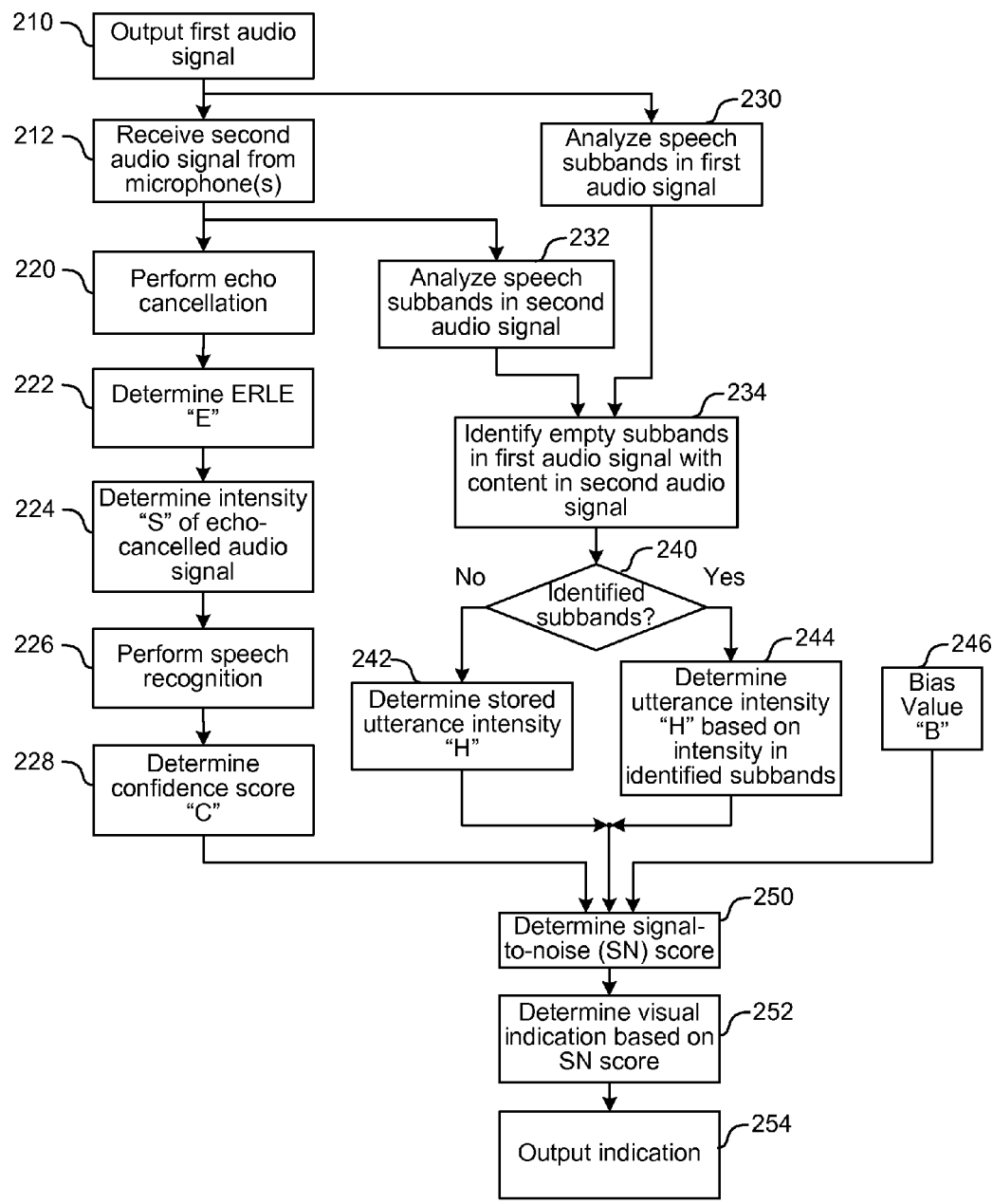
FIG. 2 illustrates a process performed to determine whether to indicate that a speech input is likely not to be understood by the speech-enabled device.

FIG. 2 illustrates a more detailed process that may be performed by the device 110 to determine whether to indicate that a speech input is or is not likely to be understood by the speech-enabled device. As in step 130 in FIG. 1, the device 110 outputs (210) a first audio signal (e.g., music) to one or more speakers (e.g., 116, 122). The speakers output an audible sound 124 corresponding to the first audio signal. When the speakers (e.g., 116, 122) are outputting the audible sound, a user 10 may direct speech input 11 at the device 110, such as speaking a wake word. This wake word is received by one or more microphones 112 of the device 110. The microphones of the device 110 may also receive a portion of the audible output from the speakers based on the proximity of the speakers to the device 110. Thus, the device receives (212) a second audio signal from one or more microphones, such as microphone array 112. The second audio signal may include, for example, an audio signal corresponding to the wake word and a portion of the first audio signal from one or more of the speakers.

The device 110 performs echo cancellation (220) to remove the portion of the first audio signal from the second audio signal, which results in generation of a third audio signal. An ERLE value "E" is determined (222), either by an echo canceller of the device 110 or by comparing the third audio signal with the second audio signal. An average intensity "S" of the third audio signal over time is determined (224), such as by calculating a moving average of the intensity over time.

The device may perform speech recognition 226 to determine whether a spoken command is included in the third audio signal. When speech recognition is performed, a confidence score "C" is calculated (228) indicating how closely audio content in the echo-cancelled third audio signal matches a pattern of a word or phrase in the speech recognition system's lexicon, such as a wake word. Among other techniques to determine confidence scores are the use of hidden Markov models to characterize the degree of similarity with the pattern of the word of phrase that most closely matches the speech input. Based on whether this confidence score is above or below a threshold value, the device 110 determines whether or not to execute an action in response to the interpreted word or phrase.

The device 110 also executes a voice activity process to determine whether there is likely voice activity in the echo-cancelled third audio signal. Since poor echo cancellation may corrupt the results of speech recognition (226), the voice activity detection process is instead based on analyzing speech subbands in the first and second audio signals.

There is a range of frequency sub-bands associated with the fundamental frequencies of human speech. The device analyzes (230) the speech subbands in the first audio signal to determine whether any of the subbands in the first audio signal have an amplitude below a first minimum threshold amplitude value. The range of fundamental frequencies of human speech are generally in a range of 85 Hz to 255 Hz. The sub-bands may be adjacent (e.g., each sub-band covering a frequency range determined by dividing the range of fundamental frequencies by the number of sub-bands) or overlapping. The device 110 analyzes (232) these same subbands in the second audio signal to determine amplitudes in each subband, and compares the results with those from the first audio signal to identify (234) subbands in the first audio signal below that are below the first minimum threshold amplitude value that have amplitudes above a second minimum amplitude threshold value in the second audio signal. The second minimum amplitude threshold is greater than or equal to the first minimum amplitude threshold.

If there are no identified subbands (240 "No") and/or the identified subbands are not consistent with stored subband vocal patterns. then either there is no speech input 11 or the device 110 is unable to detect such voice activity. In this case, an estimated average sound intensity may be determined (242) as an approximation of an utterance intensity "H" of speech input, should speech input be received. The stored value may be based on the average energy of an utterance from a person and the average distance a person is likely to stand away from the microphone(s) 112.

If there are identified subbands (240 "Yes") and/or the identified subbands are consistent with stored subband vocal patterns, the device determines (244) the utterance intensity "H" as an average intensity of the energy in the identified sub-bands in the second audio signal. The average intensity of the energy in those sub-bands is an approximation of the average sound intensity of the utterance 11.

A bias value "B" 246 may also be provided to enable refinement of how the device characterizes whether it is or is not likely to be able to interpret speech input. The bias value "B" may be used to adjust the device's prediction based on the accuracy of those predictions over time in cases where the speech recognition system detects speech input. The refinement of the bias value "B" over time will be discussed further below in connection with FIG. 3.

The value of "E" and one or more of "S," "E," "C," and "B" are used to calculate (250), a signal-to-noise (SN) score. In general, this maybe be expressed as a function SN=f(H,S, E,B,C). As a linear example, the SN score may be set based on the equation H+S+E+B. The bias value B 246 may be initialized at zero and refined over time. As another linear example, the SN score may be set based on the equation H+S+E+B+(C*p), where "p" is a conversion factor between the percentage of the confidence score "C" and equivalent decibels. These linear examples are two possible equations that may be used to calculate the SN score. Different weights may be provided for the different factors (H, S, E, C, and B) used to calculate the score, with the ERLE value typically being given the greatest weight when calculating an SN score. Also, polynomial terms may be applied to produce a non-linear equation. In another non-linear case, multiple equations may be applied. For example, one equation may be applied to the factors when "E" is high, and another equation applied to the factors when "E" is low. In some circumstances, a multiplier may be applied to H, S, C, or B that includes zero within its range, which may result in that factor not directly influencing an individual SN score.

Machine-learning algorithms may also be used to determine which formulas to apply depending upon the factors. For example, actual measurements of B, E, S, C, and H may be taken in a live environment or a number of different environments. Using supervised learning to train the machine-learning algorithm, the actual measurements are input together with a manual indication of what the output indications (254) should have been for those cases. The machine-learning algorithm then adaptively determines the applied equations (250) and the corresponding indication (252) to be output.

The SN score is used to determine (252) a visual indication which is output (254) for the user 10. For example, the SN score may be compared to one or more threshold values which quantify the likelihood that a user's speech input will be understood, such as, whether the SN score is greater than 5 dB (decibels), indicating that the device's speech recognition system is likely to be able to interpret a speech input. In this case, no visual indication might be output, or a visual indication indicating a likelihood that voice-command input will be understood. If the SN score is between 0 (zero) dB and 5 dB, the third audio signal might be understood by speech recognition, but the sound quality makes the predicted outcome of speech recognition uncertain and a distinctive visual indication may be output that is different from the visual indication when the SN score is greater than 5 dB. If the SN score is less than zero dB, the quality of the third audio signal is determined to be poor and a speech input is unlikely to be understood by the device. In this instance, the device may be unable to perform speech recognition processing, and another distinctive visual indication may be output to the user to indicate that speech input 11 is unlikely to be understood. For example, the output indication may illuminate visual indicator 114 with a specific color (e.g., red) to indicate that the device is unlikely to be able to process an audible input due to the interference. Examples of differences between visual indications include difference in color, difference in brightness, and differences in continuity (e.g., flashing, not flashing, periodicity/speed of flashing, etc.).

As an alternative to determining (252) the visual indication based on a comparison of the SN score to one or more thresholds, a progressive indication may be output, such as determining an intensity of the visual indication that is inversely related to the SN score. In a progressive arrangement, better SN scores corresponding to less interference will produce a less intense output in comparison to SN scores corresponding to more interference. Using either the progressive or threshold-based approaches, hysteresis or similar change-dampening approach may be used when determining (252) the visual indication to prevent the output indication from rapidly changing, filtering changes to the output indication to provide continuity over time.

Figure 3:
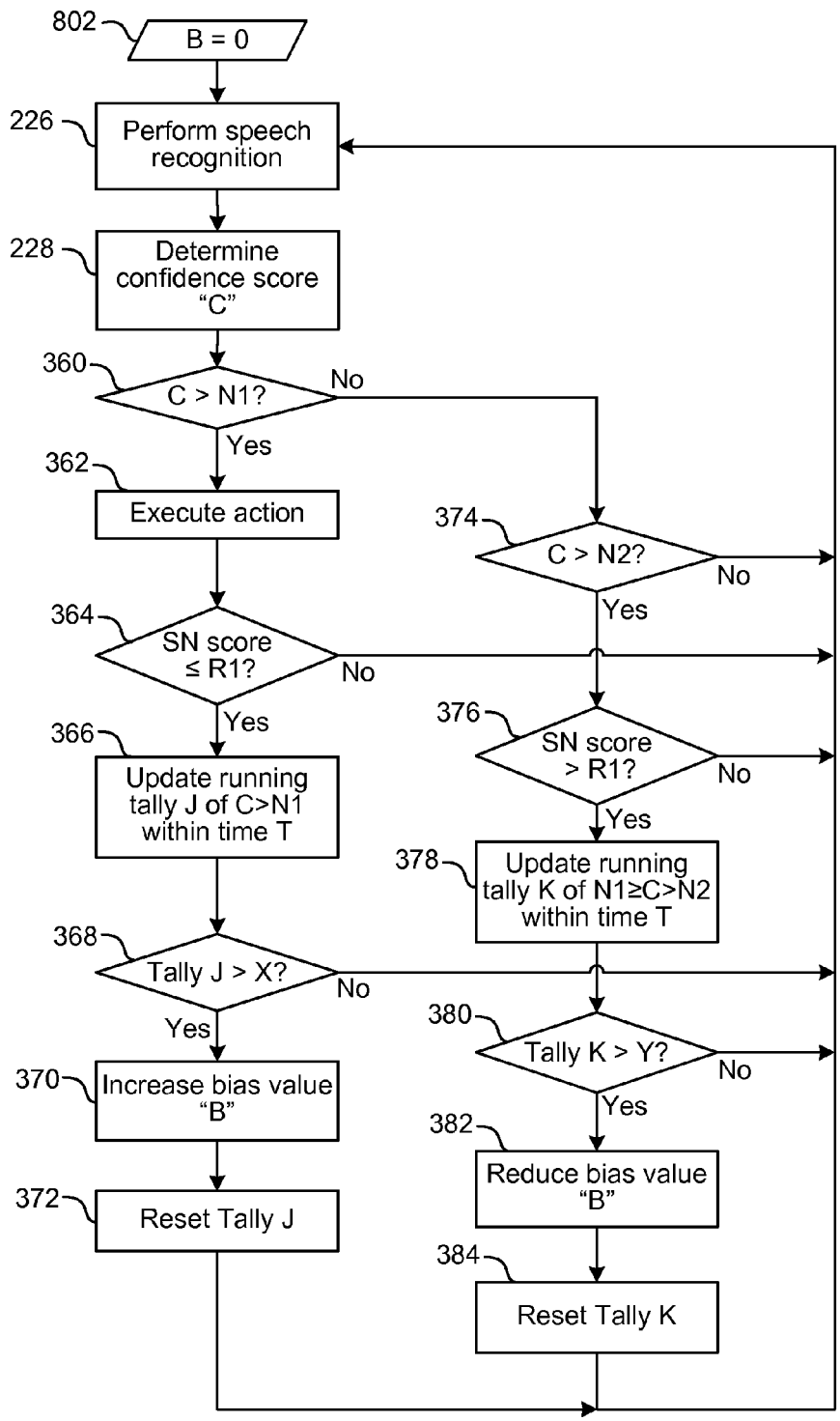
FIG. 3 illustrates a process to refine a bias value used to determine when to indicate that a speech input is likely not to be understood, when the speech processing results are repeatedly close to being understood.

FIG. 3 illustrates a process to refine the bias value "B" 240 that is used in the process illustrated in FIG. 2. The process in FIG. 3 is performed, for example, by the device 110 in FIG. 1. Initially, the bias value may be set (802) to zero. As noted above, the bias value may be added to the other variables used to calculate the SN score, such as E, S, N, and/or C. The bias allows the device to automatically refine the SN score threshold over time so that when there are multiple speech recognition results with confidence scores just below a threshold above which the device acts upon the interpreted result, but the device indicated that the result would be understood, to improve the accuracy of the output indication 254. Likewise, the device may automatically adjust the bias value when the device repeatedly indicates that speech recognition will not or is not likely to be understood, but then is understood.

In the process in FIG. 3, the device 110 performs speech recognition (226) on the third audio signal. The speech recognition system determines (228) a speech recognition confidence score "C" for each interpreted speech input. The device 110 will execute (362) an action indicated by an interpreted speech input that has a speech recognition confidence score greater than a first confidence level N1 (360 "Yes").

A determination (364) is also made as to whether the SN score corresponding to the signal containing the speech input had an SN score less than or equal to an interference threshold R1 (e.g., 5 (zero) dB). If C is greater than N1 (360 "Yes") and the SN score is less than or equal to R1 (364 "Yes"), a running tally "J" is updated 366. The running tally "J" keeps track of how many interpreted results were acted upon where the device indicated that speech recognition would be or was likely to be unsuccessful. The running tally "J" is time sensitive, with old results periodically being flushed so that adjustments to the bias value "B" are based on recent acoustic conditions.

If the tally J within time period "T" exceeds a value "X" (368 "Yes"), the device 110 increases (370) the bias value "B." This increases the value of future SN scores, making it more likely that the device will indicate that the speech input will be understood. For example, if R1 if 5 dB and is used to determine (252) the visual indication, a sample before the increase with an SN score of 4.5 db would result in an indication that a sample will not or is not likely to be understood, whereas after the bias value "B" is increased (for example) 1 dB, the same sample would have an SN score of 5.5 db. Since the increased SN score is above the R1 threshold, the device would indicate that the speech input will be understood. After increasing the bias value "B," the stored values used to calculate tally "J" are flushed (372), resetting tally "J" to zero.

If the confidence score is less than or equal to N1 (360 "N"), the interpreted result may not be acted upon. The confidence score "C" may then be compared (374) to another threshold N2. A confidence score between N1 and a second confidence score N2 indicates that the speech input had a confidence value that was proximate to but below the threshold N1 at which the device executes (362) an action based on an interpreted result. For example, on a 100 point speech recognition processing confidence scale, N1 might be set to 90 and N2 set to 85. An interpreted utterance with a "C" score above 90 would be acted upon, while a score between 85 and 90 would not.

A determination (376) is also made as to whether the SN score corresponding to the signal containing the speech input had an SN score greater than the interference threshold R1 (e.g., 5 (zero) dB)(376 "Yes"). If C is between N1 and N2 (374 "Yes") and the SN score is greater than R1 (376 "Yes"), a running tally "K" is updated (378). The running tally "K" keeps track of how many interpreted results had confidence scores between N1 and N2, such that they were not acted upon, and where the device also indicated that speech recognition would be able to understand speech input (376 "Yes"). The running tally "K" is also time sensitive, with old results periodically being flushed so that adjustments to the bias value "B" are based on recent acoustic conditions.

If the tally "K" within time period "T" exceeds a value "Y" (380 "Yes"), the device 110 reduces (382) the bias value "B." This reduction of the bias value reduces the values of future SN scores, making it less likely that the device will indicate that the speech input will be understood. For example, if R1 is 5 dB and is used to determine (252) the visual indication, a sample before the increase with an SN score of 5.5 db would result in an indication that an audio sample will be understood, whereas after "B" is decreased (for example) 1 dB, the same sample would have an SN score of 4.5 db. Since the decreased SN score is below the R1 threshold, the device would indicate that the speech input will not be understood or is unlikely to be understood. Although the same SN score threshold R1 is illustrated in the comparison operations 364 and 376, a different SN score threshold may be used to tally results leading to bias value increases and to tally results leading to decreases bias value.

As another alternative, instead of using a specific range of (N1, N2) to determine whether to refine the bias value "B" used to weight the SN score, fuzzy logic techniques may be used to analyze the confidence scores above and below the actionable threshold (N1), determining a statistical distribution of successful "C" scores that were predicted to be unsuccessful (e.g., with SN scores≤R1) and unsuccessful scores that were predicted to be successful (e.g., with SN scores>R1). Based on (for example) the skew of the distribution, a determination may be made to reduce (382) or increase (370) the bias value 246.

Figure 4:
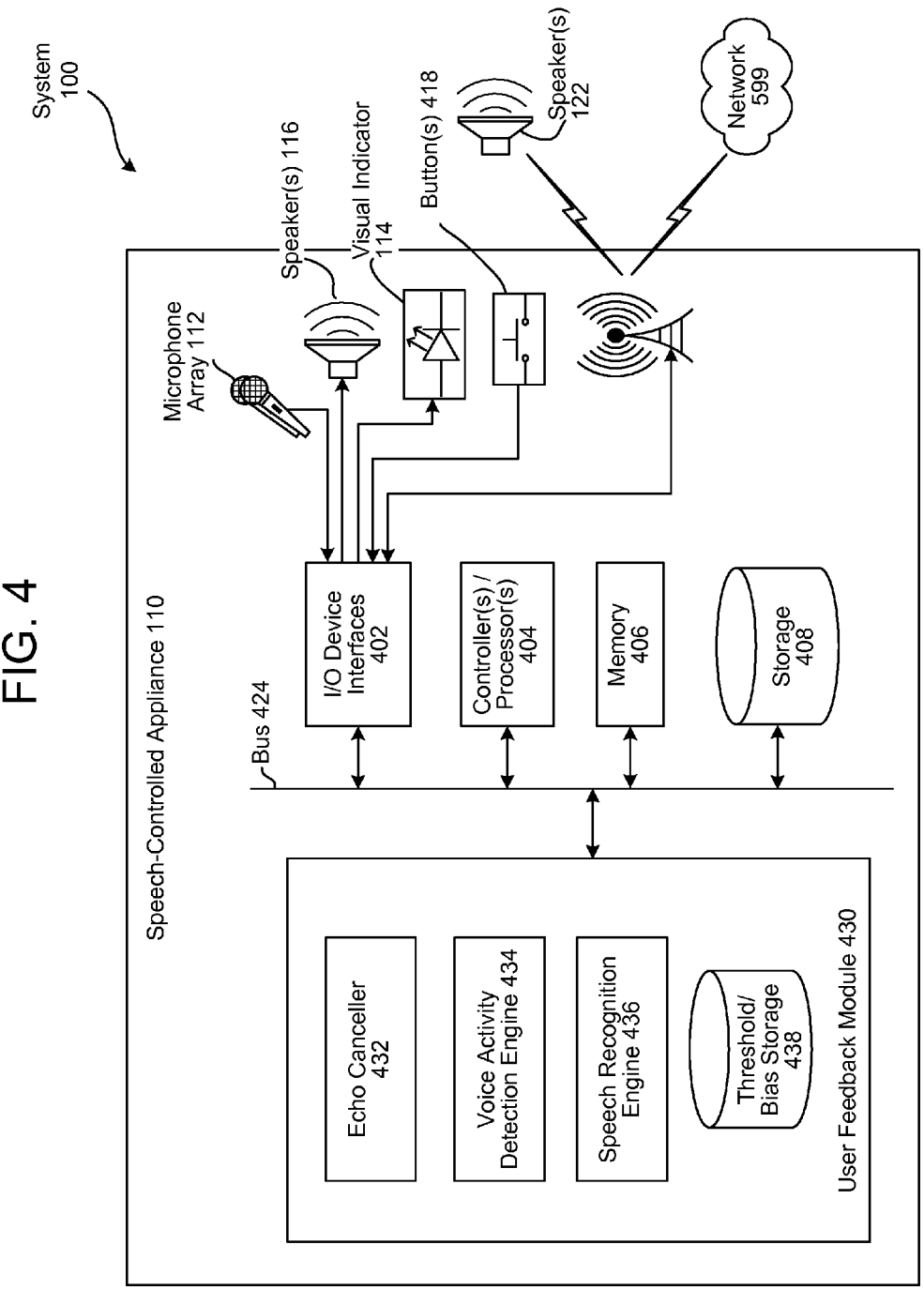
FIG. 4 is a block diagram conceptually illustrating example components of the speech enabled device.

FIG. 4 is a block diagram conceptually illustrating example components of the system 100. In operation, the system 100 may include computer-readable and computer-executable instructions that reside on the speech-controlled appliance 110, as will be discussed further below.

As illustrated in FIG. 4, the speech-controlled appliance 110 may be connected to external components such as a wireless speaker(s) 122. The system 100 may include one or more audio capture device(s), such as a microphone or an array of microphones 112. The audio capture device(s) may be integrated into the speech-controlled appliance 110 or may be separate. The system 100 may also include an audio output device for producing sound, such as speaker(s) 116, and external speaker(s) 122. The audio output device may be integrated into the speech-controlled appliance 110 or may be separate.

The speech-controlled appliance 110 may include an address/data bus 424 for conveying data among components of the speech-controlled appliance 110. Each component within the speech-controlled appliance 110 may also be directly connected to other components in addition to (or instead of) being connected to other components across the bus 424.

The speech-controlled appliance 110 may include one or more controllers/processors 404, that may each include a central processing unit (CPU) for processing data and computer-readable instructions, and a memory 406 for storing data and instructions. The memory 406 may include volatile random access memory (RAM), non-volatile read only memory (ROM), non-volatile magnetoresistive (MRAM) and/or other types of memory. The device 100 may also include a data storage component 408, for storing data and controller/processor-executable instructions (e.g., instructions to perform the processes illustrated in FIGS. 1 to 3). The data storage component 408 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through input/output device interfaces 402.

Computer instructions for operating the device 110 and its various components may be executed by the controller(s)/processor(s) 404, using the memory 406 as temporary "working" storage at runtime. The computer instructions may be stored in a non-transitory manner in non-volatile memory 406, storage 408, or an external device. Alternatively, some or all of the executable instructions may be embedded in hardware or firmware in addition to or instead of software.

The device 110 includes input/output device interfaces 402. A variety of components may be connected through the input/output device interfaces 402, such as the speaker(s) 116, the microphones 112, the visual indicator 114, and one or more physical or touch-sensitive buttons 418 (e.g., a microphone mute button, a calibration button, etc.)

The input/output device interfaces 402 may also include an interface for an external peripheral device connection such as universal serial bus (USB), FireWire, Thunderbolt or other connection protocol. The input/output device interfaces 402 may also support wired and wireless external connections, such as a connection to an external network or networks (599), and a connection to the external speaker(s) 122. Examples of such interfaces include an Ethernet port, a wireless local area network (WLAN) (such as Wi-Fi™) radio, Bluetooth™, and/or wireless network radio, such as a radio capable of communication with a wireless communication network such as a Long Term Evolution (LTE) network, WiMAX network, 3G network, etc. Through the network 599, the system 100 may be distributed across a networked environment, as will be discussed further below with FIG. 5.

The speech-controlled appliance 110 further includes a user feedback module 430 that performs the processes in FIGS. 1 to 3, in conjunction with other processes executed by the controller(s)/processor(s) 404. The user feedback module includes an echo canceller 432 that removes the first audio signal from the second audio signal to produce the third audio signal, and determines the ERLE. The voice activity detection engine 434 analyzes the speech subbands (232/234) and identifies (234) speech subbands substantially devoid of content in the first audio signal that contain content in the second signal. The voice activity detection engine 434 also determines (244) the measured average utterance intensity "H" based on the energy intensity in those sub-bands in the second audio signal. A speech recognition engine 436 performs (226) speech recognition on utterances 11 in the third audio signal, and calculates (228) the confidence score "C". Storage 438 contains the various thresholds, counter values, and the bias value. Storage 438 may be part of memory 406, storage 408, or dedicated storage.

Multiple devices 110 may be employed in a single speech recognition system. In such a multi-device system, each of the devices 110 may include different components for performing different aspects of the user feedback and speech recognition processes. The multiple devices may include overlapping components. The components of speech-controlled appliance 110 as illustrated in FIG. 4 are exemplary, and may be a stand-alone device or may be included, in whole or in part, as a component of a larger device or system.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

As illustrated in FIG. 5, multiple devices (110*a*-110*e*, 122) may contain components of the system 100 and the devices may be connected over a network(s) 599. Network(s) 599 may include a local or private network or may include a wide network such as the internet. Devices may be connected to the network(s) 599 through either wired or wireless connections. For example, a speech-controlled appliance 110*a*, glasses 110*b*, a smart watch 110*e*, and a wireless speaker 122 may be connected to the network(s) 599 through a wireless service provider, over a WiFi, via Bluetooth, via a cellular network connection or the like. Other devices, such as a desktop computer 110*c* and a server 110*d* may connect to the network(s) 599 through a wired connection. Networked devices may capture and output audio through a number of audio input devices. These audio capture and output devices may be connected to networked devices either through a wired or wireless connection. Networked devices may also include embedded audio input devices and output devices, such as an internal microphone and speakers.

In certain system configurations, one device may output the audio, another device may capture the audio and perform echo cancellation, and another device may perform speech recognition processing. For example, the speech-controlled appliance 110*a* may perform echo cancellation whereas the server 110*d* performs speech recognition processing. Because speech recognition processing may involve significant computational resources, in terms of both storage and processing power, such split configurations may be employed where the speech-controlled appliances or other speech-controlled device has lower processing capabilities than a remote device.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, echo cancellation, and speech recognition processing, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of user feedback module 430 may be implemented as firmware or as a state machine in hardware. For example, at least the voice activity detection engine 434 of the user feedback module 430 may be implemented as an executable process on a digital signal processor (DSP).

As used in this disclosure, the term "a" or "one" may include one or more items unless specifically stated otherwise. Further, the phrase "based on" is intended to mean "based at least in part on" unless specifically stated otherwise.

What is claimed is:

1. A method performed by a device, the method comprising:
   outputting, by the device, a first audio signal via a loudspeaker;
   receiving, from a microphone of the device, a second audio signal the second audio signal including information from the first audio signal reproduced by the loudspeaker;
   performing, by the device, echo cancellation to remove at least some of the information from the first audio signal from the second audio signal, producing a third audio signal;
   determining, by the device, a first sound intensity of the third audio signal;
   determining, by the device, an estimate of echo return loss enhancement (ERLE) value for the third audio signal, the ERLE quantifying how much of the first audio signal was removed from the second audio signal by the echo cancellation;
   determining, by the device, a signal-to-noise score based on the ERLE and the first sound intensity;
   comparing, by the device, the signal-to-noise score with a threshold value;
   determining, by the device, the signal-to-noise score is lower than the threshold value; and
   providing, by the device, a visual indication that speech input is unlikely to be recognized by the device in response to the signal-to-noise score being lower than the threshold value.

2. The method of claim 1, further comprising:
   determining that a sub-band of an audio frequency spectrum corresponding to a range of fundamental frequencies of human speech in the first audio signal has a first amplitude that is lower than a first minimum amplitude threshold;
   determining that the second audio signal, in a same sub-band in as the sub-band in the first audio signal, has a second amplitude greater than a second minimum amplitude threshold, the second minimum amplitude threshold being greater than or equal to the first minimum amplitude threshold;
   determining a second sound intensity based on the second amplitude; and
   determining an estimated sound intensity of a speech input received by the microphone of the device based on the second sound intensity,
   wherein determining the signal-to-noise score is further based on the estimated sound intensity of a speech input included in the second audio signal.

3. The method of claim 1, further comprising:
   determining a plurality of sub-bands of an audio frequency spectrum corresponding to a range of fundamental frequencies of human speech in the first audio signal have amplitudes below a first minimum amplitude threshold;
   determining that the second audio signal, in a same plurality of sub-band as the plurality of sub-bands in the first audio signal, also has amplitudes below the first minimum amplitude threshold, indicating an absence of speech input in the second audio signal;
   wherein determining the signal-to-noise score is based on a combination of the ERLE, the first sound intensity, and a predetermined estimated sound intensity of speech input stored on the device to approximate what the signal-to-noise score would be if speech input was received.

4. The method of claim 1, further comprising the device:
   performing speech recognition on a first speech input included in the third audio signal;
   determining a first confidence score for the speech recognition based on how closely the first speech input matches a stored pattern for a word or phrase;
   determining that the first confidence score is greater than a threshold confidence value;

executing an action associated with an interpreted speech input;

determining that the visual indication provided when the first speech input was received by the device indicated that the speech input was unlikely to be recognized by the device;

incrementing a first running tally of first instances of successful speech recognition where the visual indication was that speech input was unlikely to be recognized;

determining that the first running tally of the first instances over a defined period of time exceeds a first threshold count; and increasing a bias value and resetting the first running tally, wherein the signal-to-noise score is further based on the bias value.

5. A computing device comprising:
a processor;
a microphone;
a memory including instruction operable to be executed by the processor to perform a set of actions to configure the processor to:
   output a first audio signal including audio information;
   receive, using the microphone, a second audio signal comprising a portion of the audio information;
   perform echo cancellation to remove at least some of the portion of the audio information from the second audio signal, producing a third audio signal corresponding to the second audio signal with the at least some of the portion of the audio information removed;
   determine an estimate of echo return loss enhancement (ERLE) value for the third audio signal;
   determine a signal-to-noise (SN) score based on the ERLE value;
   determine, based on the SN score, a likelihood that speech input will be understood by the device; and
   output an indication corresponding to the likelihood.

6. The computing device of claim 5, the instructions further configuring the processor to:
   determine, based on a comparison of signal amplitudes in a plurality of sub-bands of an audio frequency spectrum corresponding to a range of fundamental frequencies of human speech, that there is speech input included in a portion of the plurality of sub-bands in the second audio signal where the speech input was not included in the audio information; and
   determine an estimated sound intensity of the speech input based on the signal amplitudes of the portion of the plurality of sub-bands;
   at least one frequency in the range of fundamental frequencies of human speech in which a sound intensity of the first audio signal is below a threshold intensity,
   wherein the SN score is further based on the estimated sound intensity of the speech input.

7. The computing device of claim 5, the memory further including a predetermined estimated sound intensity of speech input, the instructions further configuring the processor to:
   determine an absence of speech input in the second audio signal,
   wherein the SN score is further based on the predetermined estimated sound intensity of the speech input.

8. The computing device of claim 5, the instructions further configuring the processor to:
   determine a first sound intensity of the third audio signal based on a moving average over time,
   wherein the SN score is further based on the first sound intensity.

9. The computing device of claim 5, the instructions further configuring the processor to:
   perform speech recognition on the third audio signal;
   determine a first confidence score for the speech recognition based on how closely a first speech input matches a first stored pattern for a first word or phrase;
   determine that the first confidence score is greater than a threshold confidence value;
   execute an action associated with the first speech input;
   determine that the indication output when the first speech input was received by the device indicated that the speech input was unlikely to be recognized by the device;
   increment a first running tally of first instances of successful speech recognition where the indication that was output indicated that speech input was unlikely to be recognized;
   determine whether the first running tally of the first instances over a defined period of time exceeds a first threshold count; and
   increase a bias value and reset the first running tally in response to the first running tally exceeding the first threshold count,
   wherein the SN score is further based on the bias value.

10. The computing device of claim 9, the instructions further configuring the processor to:
   determine a second confidence score for the speech recognition based on how closely a second speech input matches a second stored pattern for a second word or phrase;
   determine that the second confidence score is less than the threshold confidence value;
   determine that the indication output when the second speech input was received by the device indicated that the speech input was likely to be recognized by the device;
   increment a second running tally of second instances of unsuccessful speech recognition where the indication that was output indicated that speech input was likely to be recognized;
   determine whether the second running tally of the second instances over the defined period of time exceeds a second threshold count; and
   decrease the bias value and reset the second running tally in response to the second running tally exceeding the second threshold count.

11. The computing device of claim 5, further comprising a light source, wherein:
   the instructions to determine that the likelihood that speech input will be understood by the device determine (i) that speech input is likely to be understood based on the SN score being greater than a threshold value, or (ii) that speech input is unlikely to be understood based on the SN score being less than the threshold value; and
   the instructions to output the indication (i) output a first indication via the light source in response to the likelihood being likely, and (ii) output a second indication via the light source in response to the likelihood being unlikely,
   wherein a difference between the first indication and the second indication is one or more of a difference in color, intensity, and flashing periodicity.

12. The computing device of claim 5, further comprising a light source, wherein the instructions to output the indication corresponding to the likelihood configure the processor to control an intensity of the light source, the intensity being inversely related to the likelihood.

13. A non-transitory computer-readable storage medium storing processor-executable instructions for controlling a computing device, comprising program code to configure the computing device to:
  output a first audio signal including audio information;
  receive, using the microphone, a second audio signal comprising a portion of the audio information;
  perform echo cancellation to remove at least some of the portion of the audio information from the second audio signal, producing a third audio signal corresponding to the second audio signal with the at least some of the portion of the audio information removed;
  determine an estimate of echo return loss enhancement (ERLE) value for the third audio signal;
  determine a signal-to-noise (SN) score based on the ERLE value;
  determine, based on the SN score, a likelihood that speech input will be understood by the device; and
  output an indication corresponding to the likelihood.

14. The non-transitory computer-readable storage medium of claim 13, wherein the program code is to further configure the computing device to:
  determine, based on a comparison of signal amplitudes in a plurality of sub-bands of an audio frequency spectrum corresponding to a range of fundamental frequencies of human speech, that there is speech input included in a portion of the plurality of sub-bands in the second audio signal where the speech input was not included in the audio information; and
  determine an estimated sound intensity of the speech input based on the signal amplitudes of the portion of plurality of the sub-bands;
  at least one frequency in the range of fundamental frequencies of human speech in which a sound intensity of the first audio signal is below a threshold intensity,
  wherein the SN score is further based on the estimated sound intensity of the speech input.

15. The non-transitory computer-readable storage medium of claim 13, further storing a predetermined estimated sound intensity of speech input, wherein the program code is to further configure the computing device to:
  determine an absence of speech input in the second audio signal,
  wherein the SN score is further based on the predetermined estimated sound intensity of the speech input.

16. The non-transitory computer-readable storage medium of claim 13, wherein the program code is to further configure the computing device to:
  determine a first sound intensity of the third audio signal based on a moving average over time,
  wherein the SN score is further based on the first sound intensity.

17. The non-transitory computer-readable storage medium of claim 13, wherein the program code is to further configure the computing device to:
  perform speech recognition on the third audio signal;
  determine a first confidence score for the speech recognition based on how closely a first speech input matches a first stored pattern for a first word or phrase;
  determine that the first confidence score is greater than a threshold confidence value;
  execute an action associated with the first speech input;
  determine that the indication output when the first speech input was received by the device indicated that the speech input was unlikely to be recognized by the device;
  increment a first running tally of first instances of successful speech recognition where the indication that was output indicated that speech input was unlikely to be recognized;
  determine whether the first running tally of the first instances over a defined period of time exceeds a first threshold count; and
  increase a bias value and reset the first running tally in response to the first running tally exceeding the first threshold count,
  wherein the SN score is further based on the bias value.

18. The non-transitory computer-readable storage medium of claim 17, wherein the program code is to further configure the computing device to:
  determine a second confidence score for the speech recognition based on how closely a second speech input matches a second stored pattern for a second word or phrase;
  determine that the second confidence score is less than the threshold confidence value;
  determine that the indication output when the second speech input was received by the device indicated that the speech input was likely to be recognized by the device;
  increment a second running tally of second instances of unsuccessful speech recognition where the indication that was output indicated that speech input was likely to be recognized;
  determine whether the second running tally of the second instances over the defined period of time exceeds a second threshold count; and
  decrease the bias value and reset the second running tally in response to the second running tally exceeding the second threshold count.

19. The non-transitory computer-readable storage medium of claim 13, wherein:
  the program code to determine the likelihood that speech input will be understood by the device is to configure the computing device to determine (i) that speech input is likely to be understood based on the SN score being greater than a threshold value, or (ii) that speech input is unlikely to be understood based on the SN score being less than the threshold value; and
  the program code to output the indication corresponding to the likelihood is to configure the computing device to control a light source to (i) output a first indication in response to the likelihood being likely, and (ii) output a second indication via the light source in response to the likelihood being unlikely,
  wherein a difference between the first indication and the second indication is one or more of a difference in color, intensity, and flashing periodicity.

20. The non-transitory computer-readable storage medium of claim 13, wherein:
  the program code to output the indication corresponding to the likelihood is to configure the computing device configure the computing device to control an intensity of the light source, the intensity being inversely related to the likelihood.

* * * * *